(12) United States Patent
Fowler et al.

(10) Patent No.: US 6,704,471 B1
(45) Date of Patent: Mar. 9, 2004

(54) SYSTEM AND METHOD FOR DETECTING AN OBSTRUCTION IN A POWER WINDOW

(75) Inventors: Stuart L. Fowler, Huntsville, AL (US); Donal G. Lawson, Gurley, AL (US)

(73) Assignee: Tec-Masters, Inc., Huntsville, AL (US)

( * ) Notice: Subject to any disclaimer, the term of this patent is extended or adjusted under 35 U.S.C. 154(b) by 210 days.

(21) Appl. No.: 10/016,922

(22) Filed: Dec. 14, 2001

Related U.S. Application Data

(60) Provisional application No. 60/255,751, filed on Dec. 14, 2000.

(51) Int. Cl.[7] ................................................. G02B 6/26
(52) U.S. Cl. ............................ 385/13; 342/27; 318/478
(58) Field of Search ............................ 385/13–16, 147, 385/900–902; 342/27–28; 362/385; 318/280, 283, 476

(56) References Cited

U.S. PATENT DOCUMENTS

| | | | | |
|---|---|---|---|---|
| 3,677,635 A | * | 7/1972 | Van Auken et al. | 399/90 |
| 3,678,282 A | * | 7/1972 | Johnson et al. | 250/559.29 |
| 5,463,371 A | * | 10/1995 | Fuller | 340/426.27 |
| 5,581,256 A | | 12/1996 | McEwan | |
| 5,661,385 A | | 8/1997 | McEwan | |
| 6,487,307 B1 | * | 11/2002 | Hennessey et al. | 382/149 |

* cited by examiner

*Primary Examiner*—Akm Enayet Ullah
(74) *Attorney, Agent, or Firm*—Lanier Ford Shaver & Payne P.C.

(57) ABSTRACT

A sensing system that includes a plurality of LEDs situated at the trailing edge of an automobile power window. The LEDs are activated when the power window is closing. The light emitted by the LEDs propagates through the window is emitted from the leading edge of the window as the window is closing. An array of detectors sense the light and transmit a signal indicating detection to a logical circuit. The logical circuit performs a logical analysis, and it transmits a signal to a controller or to the motor of the power window. A sensing method that includes transmitting light through an automobile window and detecting the signal as the window is moving to a closed position. When the signals indicate that an object is present, deactivate the motor to avoid injury or damage to an object in the line of movement of the window.

8 Claims, 9 Drawing Sheets

SYSTEM AND METHOD FOR DETECTING AN OBSTRUCTION IN A POWER WINDOW

This application claims the priority date of U.S. Provisional Patent Application No. 60/255,751 filed on Dec. 14, 2000 and entitled "A System and Method for Detecting an Obstruction in a Power Window," the disclosure of which is hereby incorporated by reference.

BACKGROUND OF THE INVENTION

1. Field of the Invention

The present invention relates to safety mechanisms for power windows in automobiles. More particularly, the present invention relates to safety mechanisms that sense obstruction in the line of movement of a power window in order to prevent injury.

2. Technical Background

A power window poses threat of injury because it can be switched ON and maintained in an ON position, regardless of obstructions caught between the window and the doorframe. The power window can be maintained in the on position either by (1) a person, a pet or a child standing or stepping on the switch, or (2) by activation of an auto-on power window. An auto-on power window includes a window having a switch that, once selected, does not require continuous activation for the window to roll up completely.

Traditionally, power windows included a mechanical safety mechanism that having either a shear pin or a clutch that stopped or disabled the window's movement when excessive resisting force was present.

A motor-driven power window may include an electronic current-monitoring device, such that when a window is closing and reaches the gasket, the resistance met by the window as it enters the gasket causes the motor to draw more current in an attempt to provide enough torque to overcome the resistive force. The electronic current monitoring device senses an increase in the current, equivalent to an increase in required torque, and when the current exceeds a predetermined threshold, the motor stops.

By design the stopping mechanism also serves as a safety mechanism. If an object becomes lodged between the leading edge of a window and the doorframe, the window motion is resisted, the current increases, and the stopping mechanism causes the motor to stop functioning. This type of stopping mechanism uses a current reading to indicate that an obstruction is caught in the power window.

A disadvantage of this type of safety mechanism is that the current monitoring device cannot discern between the increase in current as a normal result of the resistive force as the window meets the gasket and the increase in current caused by the force of an obstructing object. In other words, either the window closes under normal conditions, or an injury or some damage occurs prior to the activation of the stopping mechanism.

There are also safety mechanisms that use contact sensors. If a window manages to push an obstruction up to the point where it is in the line of sight of a sensor embedded in the doorframe, then the sensor is designed to communicate a shut-off signal to the motor. The disadvantage of a contact sensor safety mechanism is that an obstruction may be injured or damaged.

Other sensing technology is employed in the industry, for example, Radio Frequency (RF) technologies in various frequency regimes. A sensing device can include an electrode along with a tuned oscillator circuit; both situated on or near the window. In the presence of an object near the electrode, the object couples with the circuit, changing the impedance of the tuned oscillator, and causing the frequency of the oscillator to change. The change in the frequency is detected by the system as a change in phase or a change in amplitude of the signal. When the sensing device detects a frequency change, the electronics that transmit a signal to the motor that controls the movement of the power window preventing injury or damage.

A tuned circuit approach has several disadvantages. First, a system of this type is characteristically not repeatable. The environment, including weather conditions, the number of people in a vehicle, and the impedance characteristics of the obstruction in the window affects tuned circuits. In addition, an antenna or detector can also cause shielding that interferes with signal reception.

Some power window sensing devices are infrared technology. However, infrared systems are expensive and environmentally sensitive. A passive infrared system compensates for changes in the ambient environment or background. Most passive thermal sensors are background-limited; for example, an object sensed on a bright sunny day will not have nearly the contrast as it would have in the night. Therefore, it is difficult to thermally resolve the target from its environment or from the sensor's narcissistic radiation. Narcissistic radiation is the radiation emitted from a sensor that causes target discernment inaccuracies.

Lastly, radar or ranging type sensors can detect an obstruction in the line of movement of a power window. A ranging system uses a distributed antenna along the leading edge of the window. A transmitter coupled to one end of the antenna produces a sensor field along the antenna. A receiver at the opposite end uses a matched-filter to synchronize and identify signals unique to the matched transmitter. When an obstruction is in the line of movement of the power window, the characteristics of the signal change, indicating the presence of an object.

SUMMARY OF THE INVENTION

The present invention uses a light source in conjunction with a detector device in order to discern an obstruction between the leading edge of a power window and the top of an automobile doorframe. The light is positioned and arranged in such a way that the leading edge of the window is illuminated. Illuminating the leading edge of the power window allows the continuous detection of the movement of the leading edge window.

The present invention is designed to allow the use of various types of light sources in various configurations to create the necessary moveable illuminated leading edge of the power window to effectuate the present invention. An array of light emitting diodes (LEDs) can be placed physically inside the trailing edge of the power window, or the LEDs can be attached mechanically to the trailing edge of the power window. Either of these separate methods creates effective illumination of the leading edge of the power window detectable by sensors in sight view of the leading edge. Further, placing the light source(s) to propagate light into the trailing edge of the window permits use of the window as an optical waveguide to direct the light out the leading edge of the window. In addition, a filed fiber optic strip can be mounted to the leading edge such that the light is emitted and detectable by corresponding sensors.

The present invention uses the output of a sensor that is a result of an optically coupled source and sensor pair in order to control the movement of the power window. If the sensor detects light, then no obstruction is present between the leading edge of the power window and the detector that is mounted in the doorframe. If more than one sensor is present, a digital logical AND can be performed on all sensor outputs to ensure that none of the sensors have detected an obstruction.

Once an obstruction is detected, the output of the system can be used to prevent injury. Again, this can be accomplished in various ways. The output could be directly coupled to a device on the motor that causes the motor to either cease operating or operate in a reverse direction. Second, the indicative output of the system could be designed to interface with the controlling microprocessor of an automobile. The microprocessor could then use the obstruction indication to stop or reverse the motion of the power window.

The crux of the solution embodied in the present invention is to create a traveling transmitter or traveling emitter, so that the sensors or detectors follow the path of the window. If an obstruction breaks the traveling beam of light between the source and the detector then the movement of the window can be halted.

DETAILED DESCRIPTION

Figure 1:
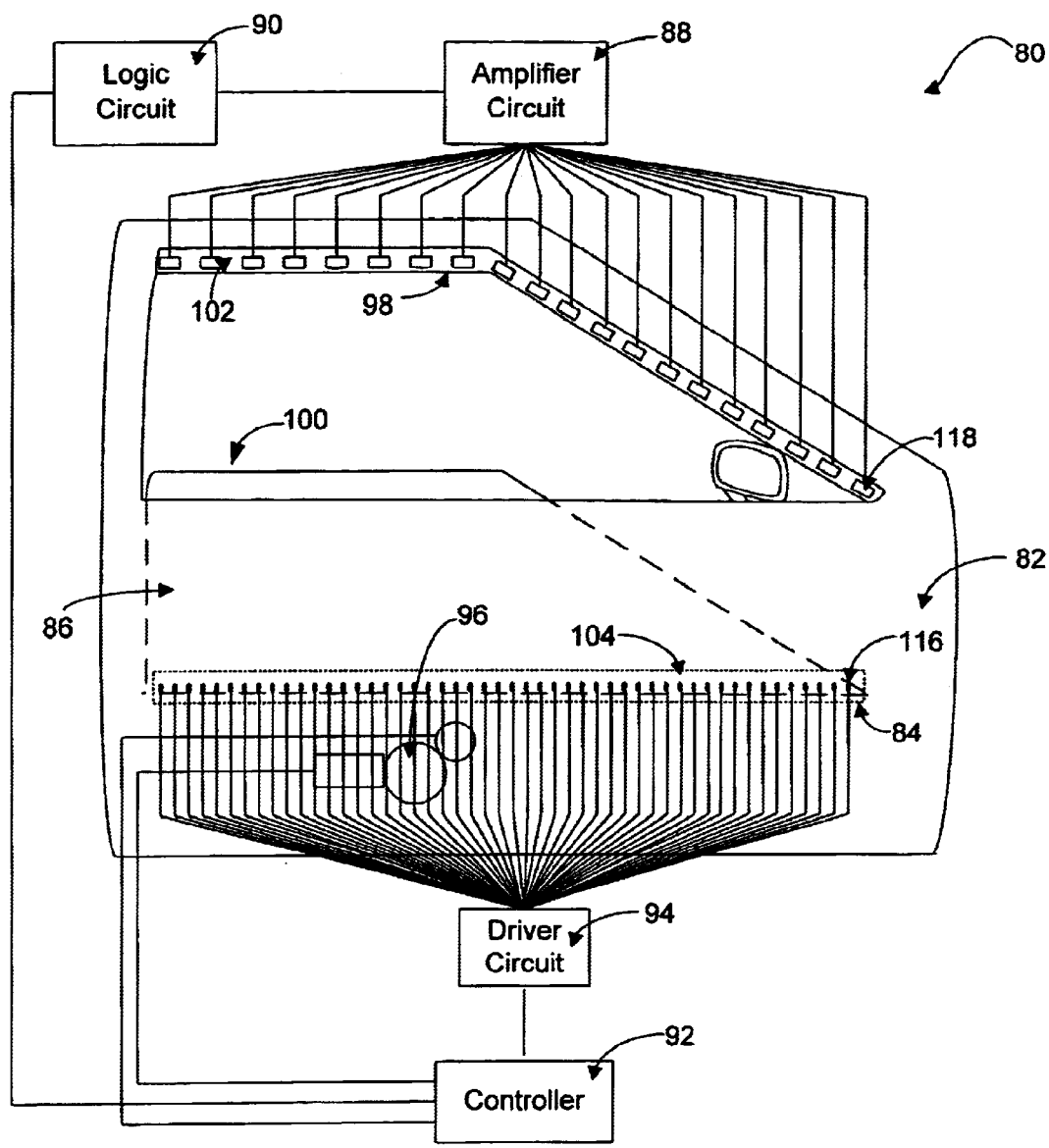
FIG. 1 is a side elevation view of a door of an automobile including an illustration of a first preferred embodiment of a sensing system of the present invention.

In general, the present invention provides a system and method for sensing an object in a power window for preventing injury or damage to the object. More specifically, a sensing system, in accordance with the present invention, uses a light source in conjunction with detectors to control power to the power window when an object is present. Reference is now made in detail to the present preferred embodiments of the invention, examples of which are illustrated in the accompanying drawing figures. Wherever possible, the same reference characters are used throughout the drawings to refer to the same or like parts.

A sensing system of the present invention is preferably configured such that it operates within a power window of an automobile, such as the sensing system 80 depicted in FIG. 1. The system 80 includes an array 102 of a plurality of detectors 118 situated within or along the gasket 98 of the doorframe 82. The window 86 includes a light source, preferably an array 104 of a plurality of LEDs 116 embedded in the trailing edge 84 of window 86 (further illustrated in FIG. 2).

The sensing system 80 detects an object that comes between the leading edge 100 of the power window 86 and the gasket 98 within the doorframe 82. Preferably, a driver circuit 94 is electrically connected to each, LED 116 in the LED array 104. In a first preferred embodiment, each LED 116 is embedded within the trailing edge 84 of a power window 86. The array of detectors 102 is preferably situated within the gasket 98 of the doorframe 82. Each detector 118 in the detector array 102 is electrically connected to an amplifier circuit 88. Amplifier circuit 88 is connected to a logic circuit 90, which in turn is connected to the power window controller 92.

The detectors 118 are preferably recessed into the gasket 98 to provide full coverage over the full extent of the door width. Consequently, the number of detectors 118 is preferably determined by the width of the window 86.

The window may be planar or curved and is preferably made of a material that does not introduce significant bulk transmission loss for the LED wavelength selected.

The LEDs 116 and the detectors 118 are coupled optically. The LEDs 116 emit light resulting in the leading edge of the window emitting light. Preferably, in order to minimize interference from outside sources, the LEDs 116 are modulated. The modulation prevents other light sources, such as a flashlight or sunlight, from interfering with the optical relationship between the LEDs 116 and the detectors 118.

The driver circuit 94 produces an electrical signal that is transmitted to each LED 116 in the LED array 104, illuminating each LED 116. The LEDs 116 produce light that travels through the window 86 and is emitted from the leading edge 100 of the window 86.

The detector array 102 includes a plurality of detectors 118 that sense the light emitted from the leading edge 100 of the window 86 as the window 86 moves toward a closed position where it rests in gasket 98.

When the detectors sense light, each of the detectors in the detector array 102 emits a signal, transmitting the signal to an amplifier circuit 88. The amplifier circuit 88 amplifies each signal, then transmits a corresponding signal to the logic circuit 90. When no object is present each detector 118 senses the light that the leading edge 100 emits. If an object breaks the light, then the detector 118 senses a change, and its output will behave accordingly.

Henceforth, the logic circuit 90 processes the output signals from the detectors 118, using the output to determine if an object is present. If the logic circuit determines that an object is present, it transmits a signal to the controller 92, and the controller then proceeds to terminate or reverse the movement of the window 86 by stopping the motor 96 or changing the direction of the motor 96.

Figure 2:
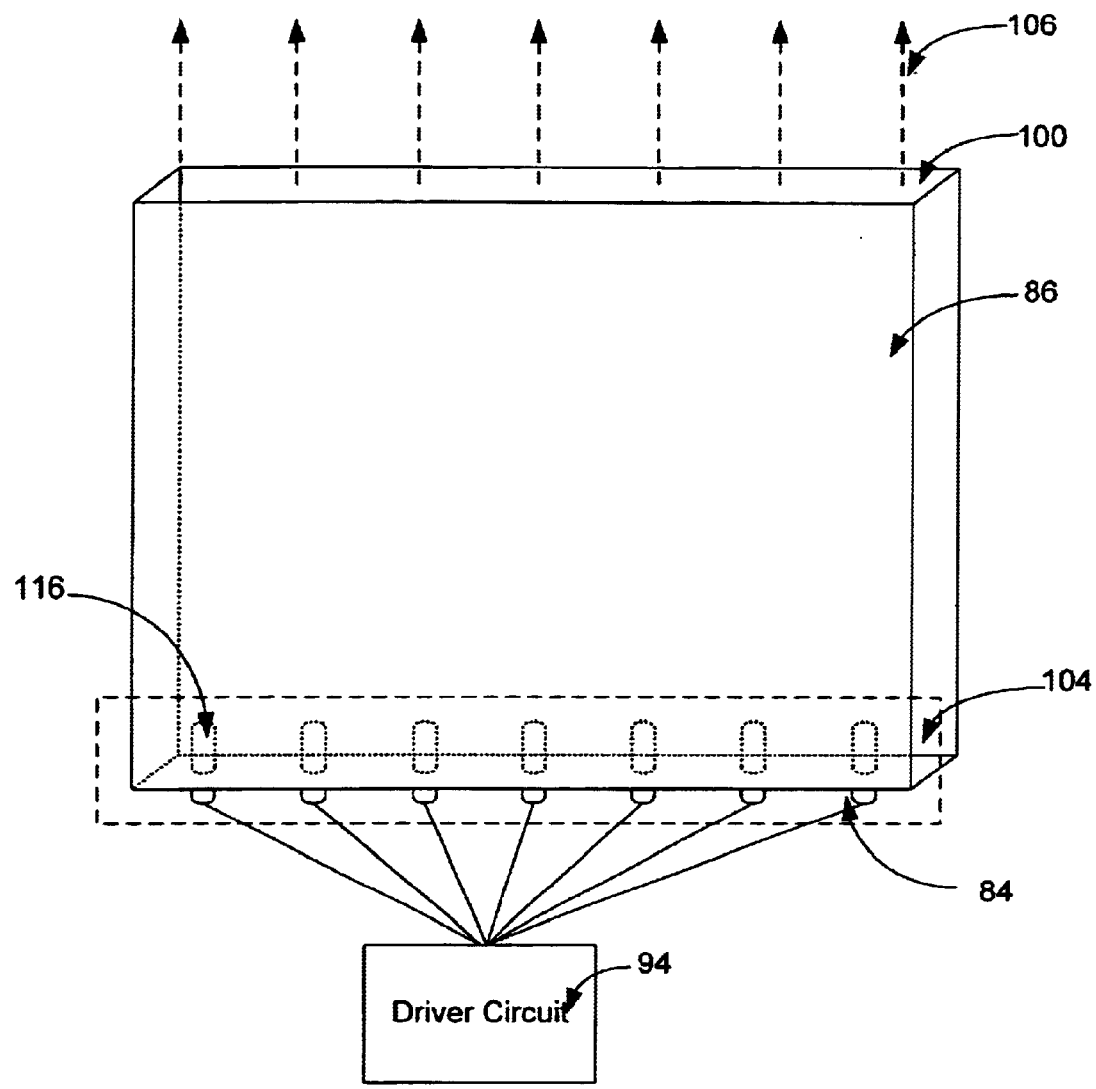
FIG. 2 is a drawing illustrating the placement of light emitting diodes (LEDs) in a trailing edge of glass as used in the sensing system illustrated in FIG. 1.

FIG. 2 illustrates an array 104 of LEDs 116 embedded in a section view of the power window 86 as implemented in the preferred embodiment illustrated in FIG. 1. As shown in FIG. 2, the driver circuit 94 is electrically connected to each of the LEDs 116 in the LED array 104. The driver circuit 94 transmits a signal that activates the LED array 104. The light produced by the LED array 104 travels through the plane of the window 86 and the leading edge 100 of the window 86 emits light, thereby creating a detectable light source 106 from the leading edge 100 of window 86. The window 86 acts as a waveguide, using total-internal reflection to all but eliminate losses over the transmission path to the leading edge 100 of the window 86. Each beam of light passes through the plane of the window and is emitted from the leading edge 100 of the window 86. No refracted light transmitted into the trailing edge 84 of the window 86 is propagated through the planar portion of the window into the second medium, air.

Figure 3:
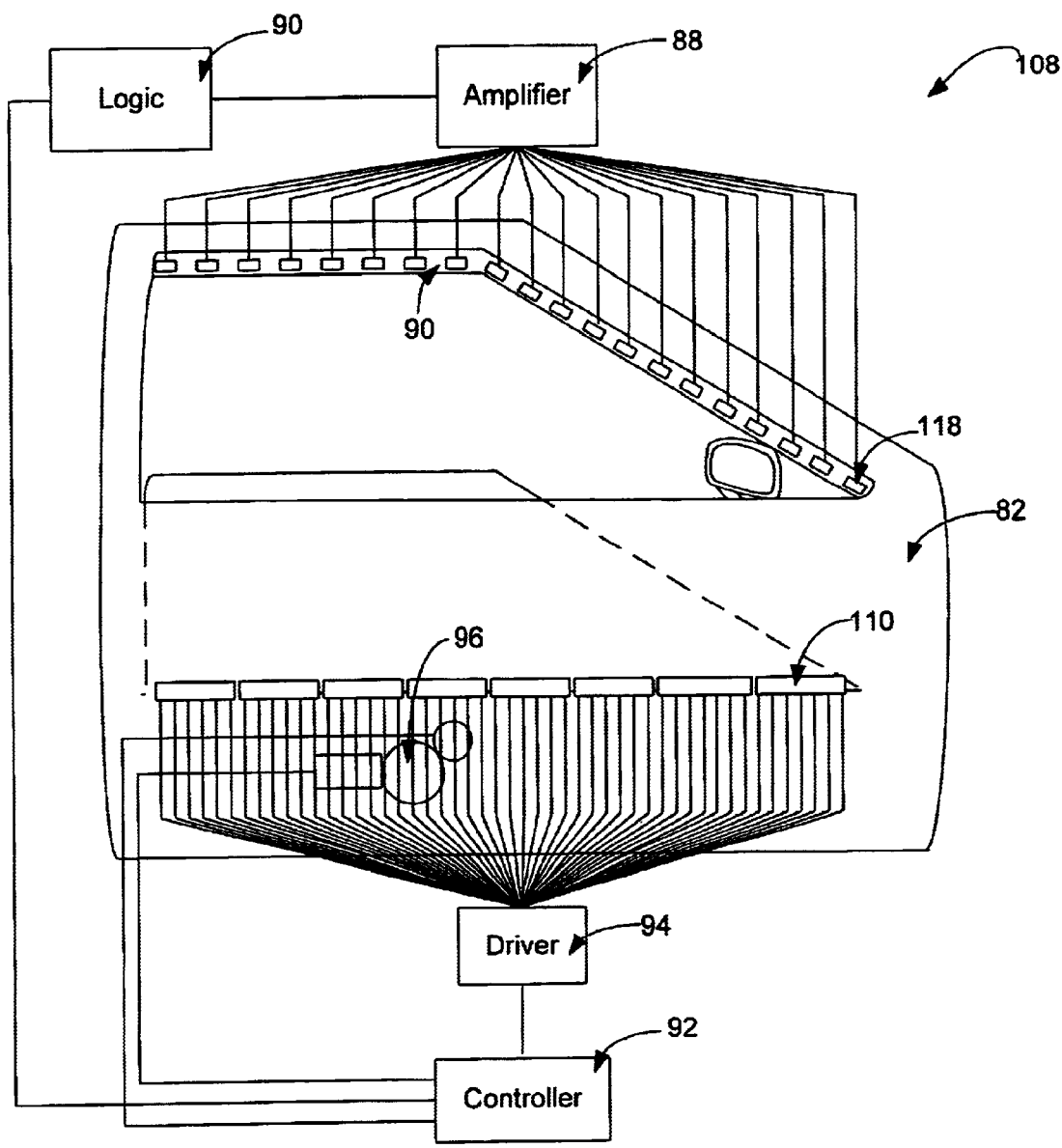
FIG. 3 is a side elevation view of a door of an automobile including a second preferred embodiment of a sensing system of the present invention.

FIG. 3 depicts a sensing system 108, which illustrates a second preferred embodiment of the present invention. Sensing system 108 also includes a driver circuit 94, an array of LEDs 104 (not shown), a detector array 102, an amplifier circuit 88, a logic circuit 90 and a controller 92. In the sensing system 108, the LED array is positioned relative to the trailing edge 84 of the window 86 by brackets 110 (further described with reference to FIG. 4).

Figure 4:
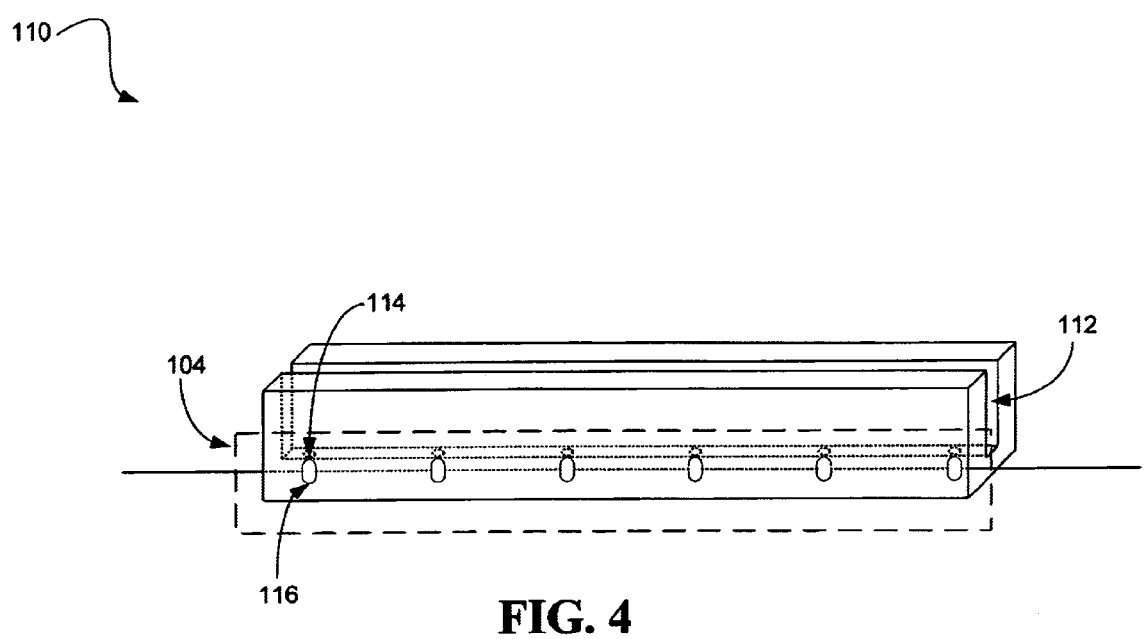
FIG. 4 is a drawing illustrating a bracket having light emitting diodes (LEDs) as employed in the sensing system illustrated in FIG. 3.

FIG. 4 is a section view of a bracket 110 as implemented in the sensing system 108 (FIG. 3) of the second preferred embodiment of the present invention. The bracket 110 is fastened to the trailing edge of the power window 86. The railing edge is situated within the slit 112 in the bracket 110. LEDs 116 are fastened to the bracket such that when the LEDs 116 receive power, light is emitted from the holes 114 in the slit 112. The light emitted is directed through the trailing edge of the window 86 (FIG. 3).

Figure 5:
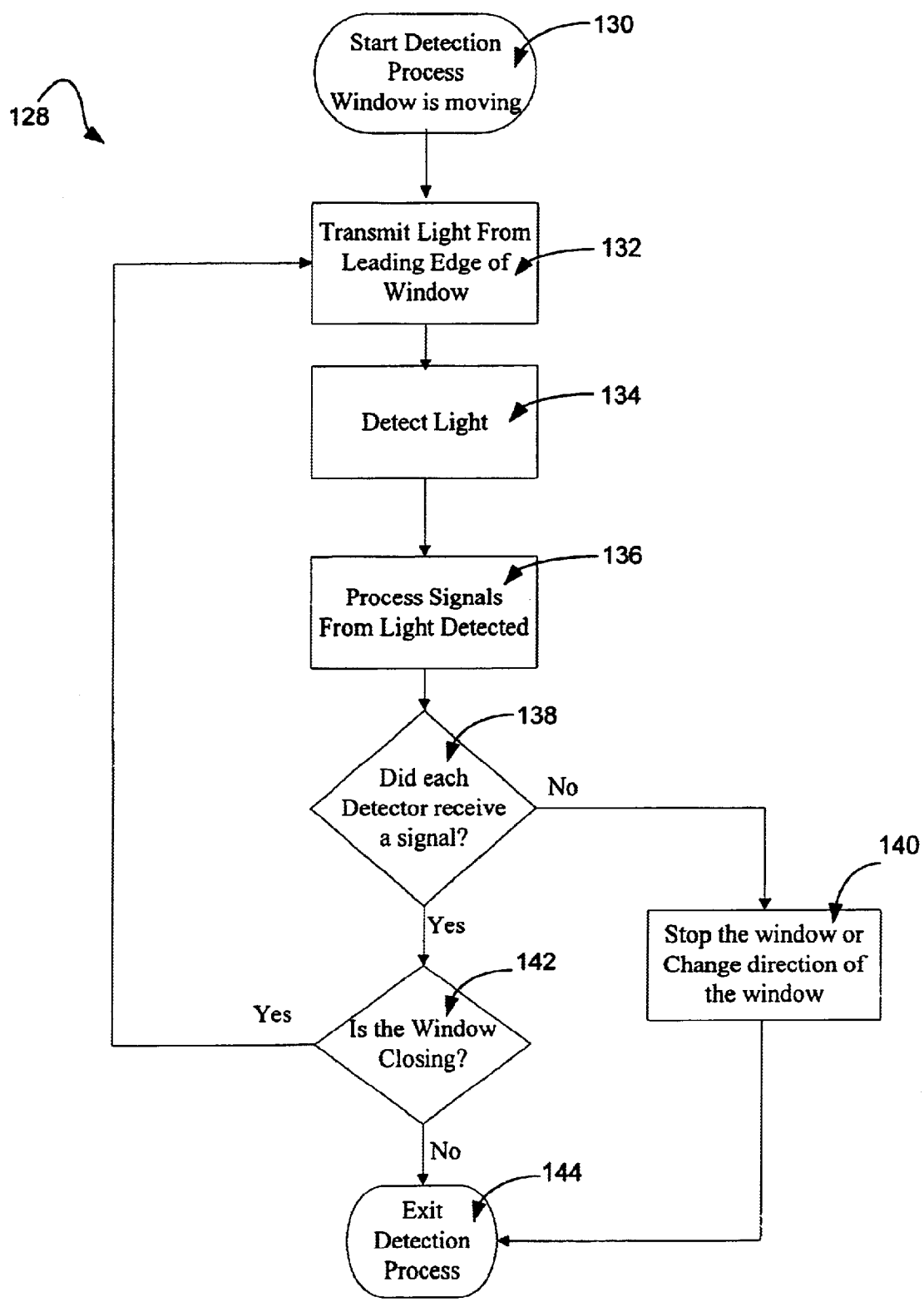
FIG. 5 is a flowchart illustrating the method of obstruction detection of the present invention implemented in the sensing systems illustrated in FIG. 1 and FIG. 3.

The detection process implemented in the sensing systems of the present invention is now described with reference to FIG. 5. The process of object detection of the present invention preferably implemented in the sensing systems 80 and 108 is illustrated with reference to the flowchart illustrating the process 128.

As indicated in the initial step 130, the detection process preferably implemented by the sensing systems 80 (FIG. 1) and 108 (FIG. 3) begins when the window 86 is moving to a closed position.

As shown in step 132, light is transmitted from the leading edge 100 of the power window 86. Preferably, the driver circuit 94 produces a signal that activates the LED array 104. The light produced by the LEDs 116 travels through the window 86 and is emitted from the leading edge 100 of the window 86.

In step 134, the detector array 102 senses the light emitted from the leading edge 100 of the power window 86. The signals are processed in step 136. If each detector does not sense light being emitted in step 138, then the process stops the motor, or changes the direction of the motor in step 140.

If each detector does receive a signal, then the process continues while the window continues closing (i.e. the window is still in motion). In step 142, if the motor is still active, then the process begins again at step 132.

Figure 6:
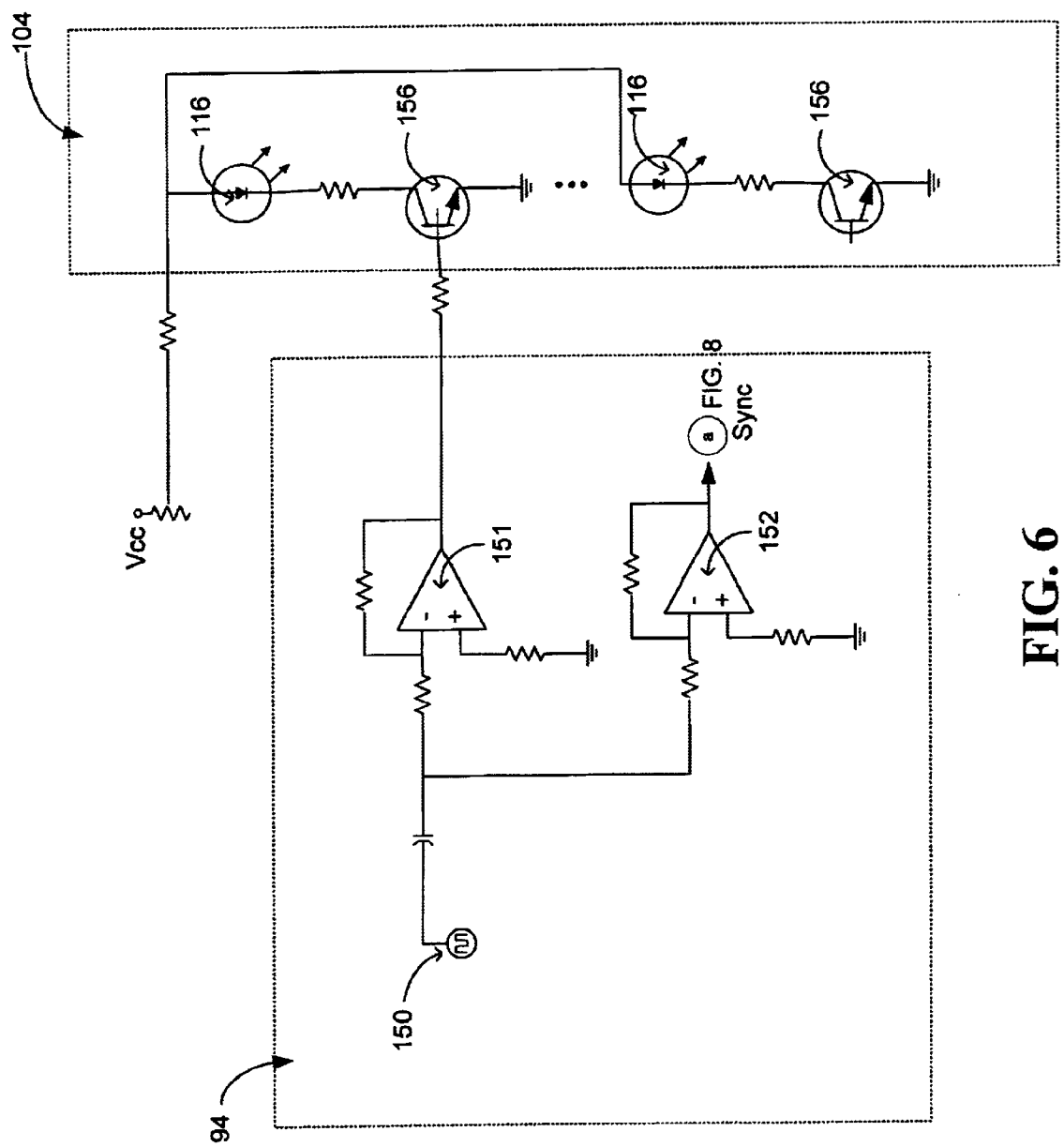
FIG. 6 is a schematic diagram of the driver circuit and the LED array of a preferred embodiment of the present invention.

FIG. 6 is a schematic illustrating the driver circuit 94 and the LED array 104 having a plurality of LEDs 116. The driver circuit 94 includes a clock 150 and two operational amplifiers 151 and 152. The clock 150 generates a signal that is an input to the operational amplifier 151. The AC-coupled operational amplifier 151 amplifies the signal produced by the clock 150. The amplified drive signal is then fanned out to as many LEDs 116 in the LED array 104 in the trailing edge 84 of the window 86 (FIG. 1 and FIG. 3). This drive signal drives transistors 156 as current gates for each LED 116. In addition, the operational amplifier 152 amplifies the signal. The amplified signal output from 152 is then sent as a sync to the receiver logic gate 168 shown in FIG. 8.

Figure 7:
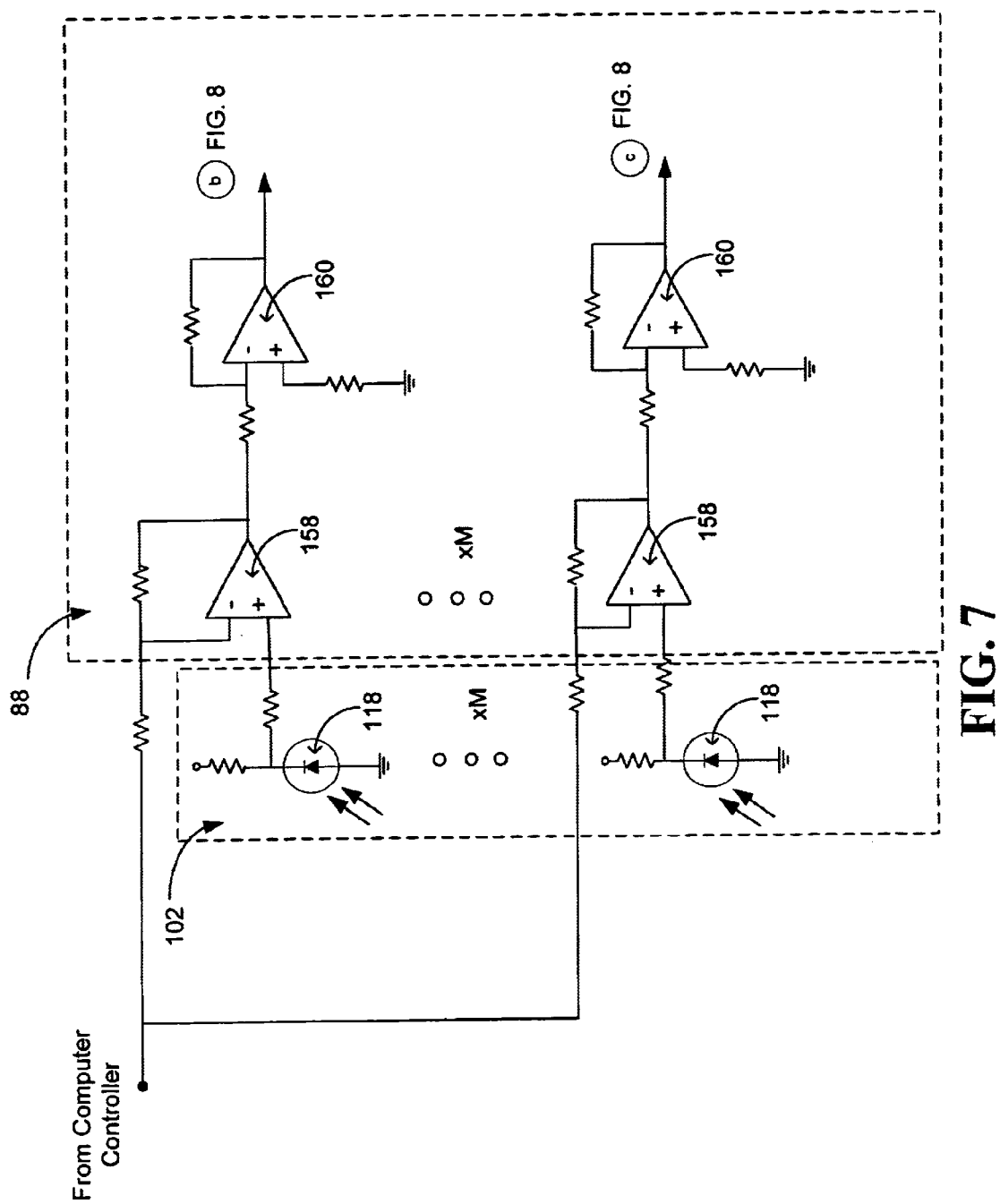
FIG. 7 is a schematic diagram illustrating the detector array and the amplifier circuit of a preferred embodiment of the present invention.

FIG. 7 is a schematic illustrating the detector array 102, having a plurality of detectors 118, and the amplifier circuit 88. Each detector 118 in the detector array 102 produces an output signal when light is sensed. Preferably, the amplifier circuit 88 is implemented as the precursor to the logical circuit 90. The amplifier circuit 88 as shown in FIG. 7 includes first stage operational amplifiers 158 and second stage operational amplifiers 160.

The detectors 118 are AC coupled to the input of the first stage operational amplifiers 158. The detectors detect light and produce a signal as input to the operational amplifiers 158. A varying bias voltage is also fed to the amplifier by the controller 92. This bias voltage is related to the position of the window by measurement of a precision potentiometer connected to the window drive mechanism of the drive motor 96 and routed to the logical circuit 90. The output of the first stage amplifier 158 is then DC-coupled to the second stage amplifier 160 before being routed to the logical circuit 90.

Figure 8:
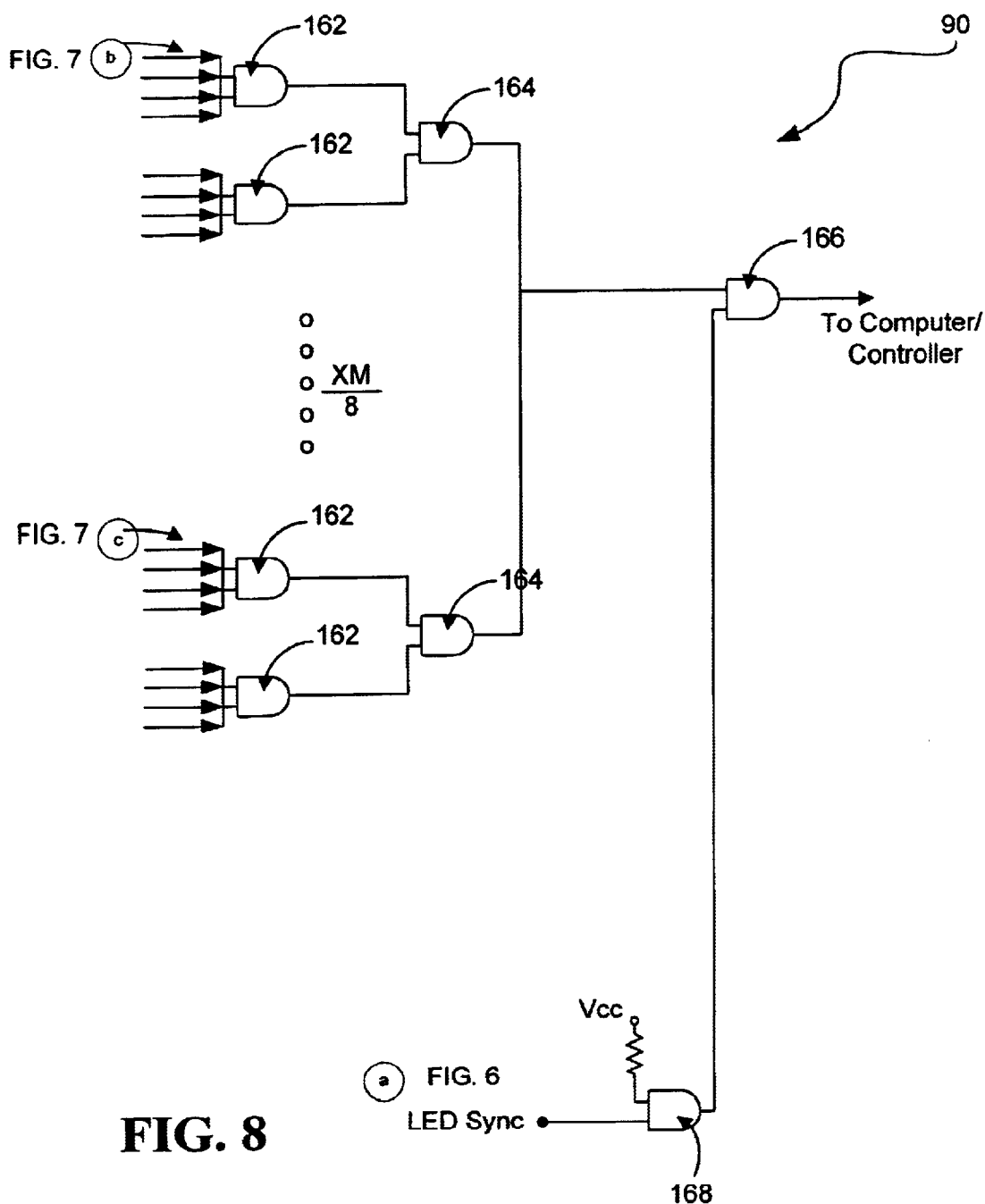
FIG. 8 is a logic circuit of a preferred embodiment of the present invention.

Preferably, a logic circuit as illustrated in FIG. 8 processes the output signal from the amplifier circuit in FIG. 7. The bias from the output signal of the second stage amplifier 160 (FIG. 7) determines whether the signal from a particular channel exceeds the logical AND gate 162 threshold. The logic circuit 90 performs a digital logical AND on the signals from the second stage amplifiers 160 (FIG. 7) with a sync signal from the operational amplifier 152 shown in FIG. 6. If the signal from any channel falls below a predefined threshold, the logical circuit 90 terminates the pulsed output signal fed to the controller 92, and the controller termites or reverses the window movement by deactivating or reversing the motor 96 (FIG. 1). The logical unit 90 can provide a digital CMOS output signal to the controller 92 or a gate that directly controls the drive motor 96.

Figure 9:
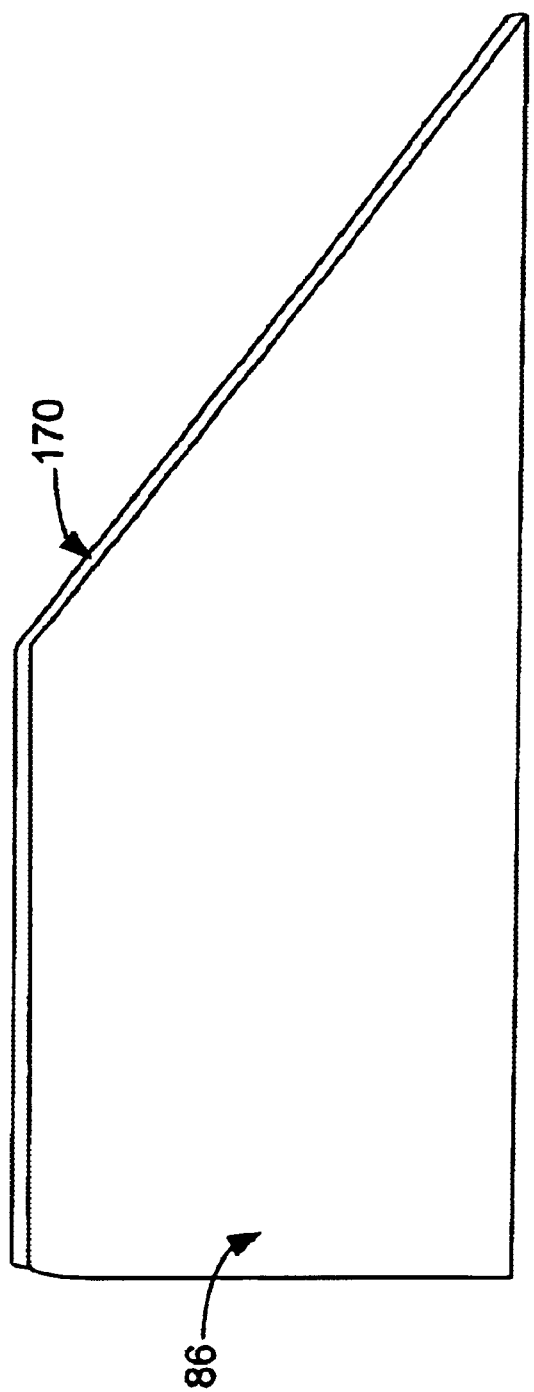
FIG. 9 is a side elevation view of a window having an illuminated strip or optical fiber along the leading edge of the window that can serve as a light source in the sensing system of the present invention.

Another embodiment of the sensing system of the present invention is a sensing system implemented with a light source as shown in FIG. 9. FIG. 9 shows a window 86 that includes a light source 170 embedded or fastened across the leading edge of the window. The light source can be an optical fiber or an electro-luminescent strip. This type of implementation of the light source of the sensing system provides a light source regardless of the optical density of the glass through which the light must propagate.

One with ordinary skill in the art will recognize that various light sources can be used as the light source including near infrared LEDs, visible LEDs, light bulbs, and laser diodes. In addition, any photo diode may be used so long as it is matched to the wavelength of the transmitter. In addition, the sensors are described as being positioned within the gasket. However, one with ordinary skill in the art will recognize that the detectors can be positioned at other positions within the system, for example on the door frame itself, and the detectors will still sense the emitted light.

It will be apparent to those skilled in the art that the embodiments of the present invention can be implemented with other systems that include the movement of glass. Other systems where the present invention can be employed include but are not limited to sunroofs in vehicles, moving car doors having windows, or any other system containing a moving piece of glass.

It will be apparent to those skilled in the art that various modifications and variations can be made to the present invention without departing from the spirit and scope of the invention. While various systems and methods of the present invention may have been shown and described with reference to specific embodiments of the system of the present invention, any and all embodiments may be used in conjunction with any of these systems and methods. Thus, it is intended that the present inventions cover the modifications and variations of this invention provided that they come within the scope of the disclosed invention.

What is claimed is:

1. A system for detecting an obstruction in a power window, said system comprising:
   a) a window having a line of movement and a leading edge;
   b) an illuminating device that emits light from the leading edge of said window;
   c) a sensor proximately positioned and arranged to detect the light and to detect the interruption of said light when an obstruction is between the leading edge of said window and the sensor, said sensor having a sensor output; and
   d) a circuit having an indicator output signal, said circuit configured to receive said output from said sensor and configured to transmit said indicator output, said indicator output indicating an obstruction.

2. A system as claimed in claim 1 wherein said illuminating device includes at least one light emitting diode situated adjacent to a trailing edge of said window such that said window serves as a waveguide directing the light.

3. A system as claimed in claim 2 wherein said at least one light emitting diode is a plurality of light emitting diodes such that the leading edge is illuminated, and further comprising a plurality of sensors situated to detect the leading edge of said window.

4. A system as claimed in claim 1 wherein said illuminating device includes a fiber optic cable having light emissions and arranged to follow the entire length of the leading edge of said window, and wherein said sensor includes an array of optical sensors proximately located to detect said light emissions.

5. A system comprising:
   a) a moving optical waveguide having a leading edge and a trailing edge;
   b) at least one light source positioned and arranged to transmit a light beam through said trailing edge of said waveguide directing the light beam such that the light beam travels through said waveguide and is emitted from the leading edge;
   c) at least one optical sensor adjacent said leading edge to detect the light beam emitted from the leading edge and having an output indicating the detection of said light beam;
   d) a logical unit designed to control said moving optical waveguide in response to receipt of the output of the optical sensor.

6. A system for detecting obstruction as in claim 5 wherein said moving optical waveguide includes a motor wherein said logical unit includes an output capable of changing the state of said motor.

7. A method of detecting an obstruction comprising:
   a) producing a detectable light source on a leading edge of a moving structure;
   b) detecting said light source with receivers proximately situated so as to view the detectable light source on the leading edge of the window;
   c) controlling the movement of the window in accordance with the signal detected.

8. A system for sensing an obstruction, comprising:
   a) an opening capable of closure in which an obstruction may be present;
   b) a structure capable of signal propagation configured to close said opening and having a leading edge and a trailing edge;
   c) a device positioned to transmit a signal into the trailing edge of said structure such that the signal propagates through said structure and is emitted from said leading edge of said structure; and
   d) a receiver capable of sensing the signal emitted from said leading edge of said structure such that the signal indicates the presence of an obstruction, said receiver positioned opposite said leading edge of said structure.

* * * * *